United States Patent Office 3,035,919
Patented May 22, 1962

3,035,919
LIGNIN-BACITRACIN COMPLEX AS GROWTH STIMULANT AND BACITRACIN PURIFIER
Jack Ziffer and Thomas J. Cairney, Milwaukee, Wis., assignors to Pabst Brewing Company, Chicago, Ill., a corporation of Delaware
No Drawing. Filed Apr. 15, 1959, Ser. No. 806,430
13 Claims. (Cl. 99—2)

This invention relates to recovery of the antibiotic bacitracin. More particularly, the invention relates to recovery of bacitracin products characterized by high stability, which include a new and very useful bacitracin complex composition, and highly purified, white bacitracin. The products include compositions especially useful in animal nutrition.

The value of bacitracin in animal nutrition and in animal and human therapy is well known, as are various bacitracin products adapted for these uses and processes for obtaining them. However, the available products and processes suffer from disadvantages which are desirably overcome. One important problem concerns the gradual loss of antibiotic activity by bacitracin compositions upon prolonged storage under adverse conditions of high humidity and temperature. Another problem is that highly pure bacitracin is difficult to produce, and colored impurities persist into the final product. Still another problem is the loss of bacitracin which occurs in the recovery processes. A further problem is the formulation of feed supplements that remain free-flowing upon storage under adverse conditions of high temperature and high absolute humidity. An additional problem is the production of effective and economical water-soluble stable bacitracin feed additives, as well as water-insoluble feed additives, not requiring extensive purification procedures.

It is therefore an object of the invention to provide bacitracin compositions which are resistant to adverse conditions of humidity and temperature.

Another object is to provide bacitracin compositions for use as feed supplements which are highly stable and fully active.

An additional object is to provide very stable highly purified white pharmaceutical bacitracin.

A further object is to provide a bacitracin feed supplement that satisfies the need for both water-insoluble and water-soluble supplements, and nutritional animal feeds prepared therewith, including solid and liquid compositions.

Another object is to provide a bacitracin feed supplement that remains free-flowing during storage under adverse humidity and temperature conditions.

A further object is to provide a process for the recovery of bacitracin in high yields.

An additional object is to provide a process useful for the preparation of feed supplements, overcoming the described disadvantages.

The objects of the invention also include the provision of a simple, reliable and economical process for obtaining the bacitracin products. These and other objects and advantages of the invention will be apparent upon reference to the specification.

It has now been discovered in accordance with the invention that a very advantageous process and bacitracin products are achieved by the formation of a solution of bacitracin and an alkali-soluble lignin protein precipitant, and recovering a solid composition of bacitracin and lignin therefrom. The composition is characterized by surprisingly high stability.

Employing an aqueous bacitracin solution of sufficient purity, useful stable compositions of bacitracin and lignin may be obtained in various ways, preferably by concentrating the solution to a solid composition or by precipitating the composition from the solution. The recovery of bacitracin by the latter method from a solution containing impurities, such as a fermentation liquor or products obtained therefrom in varying degrees of purity, is especially advantageous and preferred, as this method produces substantial concentration and purification of the bacitracin. This is important in the production of both animal feed additives and pharmaceutical bacitracin.

The ligno-bacitracin compositions thus produced are evidently complexes, as follows from their exceptional stability to heat compared to other forms of bacitracin and particularly to pharmaceutical grade bacitracin, and from their other properties. The stability is demonstrated in the following Table I, comparing several precipitated ligno-bacitracin compositions produced according to the invention as subsequently described in the examples, with dried bacitracin fermentation product and with pharmaceutical grade bacitracin. The fermentation product was obtained in the conventional manner by filtration of a whole culture broth, concentration and (vacuum double drum) drying. The pharmaceutical grade bacitracin was prepared (using Orzan A) according to the invention as subsequently described in the examples.

TABLE I

| Bacitracin preparation | Initial activity (units per gram) | Percent activity remaining after indicated hours at 110°–112° C. | | | |
|---|---|---|---|---|---|
| | | 2 hours | 4 hours | 6 hours | 24 hours |
| Pharmaceutical grade bacitracin (prepared from soluble Orzan A ligno-bacitracin) | 60,000 | 52 | 49 | 45 | 20 |
| Dried bacitracin fermentation product | 7,400 | 32 | 12 | 12 | 5 |
| Soluble Orzan A lignobacitracin | 11,100 | 68 | 63 | 69 | 39 |
| Insoluble Orzan A ligno-bacitracin | 10,300 | 80 | 70 | 73 | 44 |
| Soluble Orzan S ligno-bacitracin | 15,900 | 84 | 72 | 66 | 52 |
| Soluble Toranil B ligno-bacitracin | 14,900 | 84 | 75 | 70 | 51 |

Another comparison was made at 37° C. under controlled humidity conditions, in which dried bacitracin fermentation product was compared with the soluble and insoluble Orzan A ligno-bacitracin products shown in the table. The dried fermentation product caked after one day at 40% relative humidity. The ligno-bacitracin preparations were unaffected by exposure to 80% relative humidity for 42 days.

In precipitating the ligno-bacitracin complex, soluble lignin and a solution of bacitracin are mixed at a pH at which precipitation occurs. The pH of precipitation is generally in the range of 1–6, and optimum results will vary with the type of lignin and may vary with the type of bacitracin composition.

The precipitate as obtained may be used as a stable water-insoluble feed supplement, or it may be converted into water-soluble form by alkalizing the precipitate i.e., raising its pH, in aqueous medium until it dissolves. The pH of the solution may range from about 4.5 to 9, depending upon the same conditions affecting the pH of precipitation. A pH of greater than 9 is avoided to prevent loss of bacitracin due to instability.

The solution may be treated to recover the water-soluble complex therefrom, such as by concentration to a solid. This product is especially adapted for administration in animal drinking water, for growth stimulation or for therapeutic purposes while disease and stress conditions exist, or both.

For preparing pharmaceutical grade bacitracin, the solution may be extracted with an incompletely water-miscible polar organic solvent, i.e., at most partially miscible, extracting bacitracin into the solvent with the lignin remaining in the aqueous layer. The pH is preferably adjusted to 7–9 for extraction. Bacitracin may be recovered directly from the solvent. It is preferred for further purification to extract the bacitracin into aqueous acidic solution, at a pH of about 2–4. A lower pH may result in loss of bacitracin due to instability, and a higher pH may result in an unfavorable distribution coefficient.

Pharmaceutical grade bacitracin is recovered from the aqueous phase, preferably after alkalizing to adjust the pH to about 5–7 for preserving its stability. Recovery may be by concentration to a solid. Lyophilization is the preferred recovery method. Low temperature recovery of bacitracin as conventionally practiced is preferred to avoid inactivation.

Increased purity and potency may be obtained by repeating the sequence of extraction of bacitracin into the incompletely miscible organic solvent, extraction into acidic aqueous solution, and recovery of bacitracin from the aqueous solution.

In addition to the outstanding stability illustrated above, the ligno-bacitracin complexes are obtainable in very high potencies. They may exceed 20,000 units per gram, as compared with prior feed supplement compositions on the order of 2000 units per gram.

White pharmaceutical grade bacitracin is readily obtainable having potencies of 60,000–80,000 units per gram, and in high yields. The products have unusually high stability. For example, a typical pharmaceutical grade preparation obtained according to the present invention was tested for stability over a period of 381 days at a temperature of 52° to 58° C. The percent activity remaining after this period was 66.6%. There was no change in activity, within experimental error, during the last 234 days, as indicated by the data in the following Table II. The temperature stability values for this preparation are far in excess of those previously reported for similar products.

TABLE II

| Days | Potency, units/gram | Percent activity remaining |
|---|---|---|
| 0 | 59,000 | 100 |
| 15 | 59,000 | 100 |
| 39 | 54,000 | 91.5 |
| 65 | 49,000 | 83 |
| 147 | 40,000 | 67.8 |
| 381 | 39,300 | 66.6 |

In forming the complex ligno-bacitracin compositions, an alkali-soluble lignin which is characterized by its ability to precipitate water-soluble proteins is employed. A number of lignins are soluble in water without alkalizing.

The soluble lignins are available from the sulfite, sulfate, soda, and ammonia base processes for pulping wood. The principal types of soluble lignins available and preferred in the invention are the alkali lignins, from alkali process pulping of wood, and the ligno-sulfonates, most commonly obtained by the sulfite process for acid pulping of wood. The lignins may be further modified, such as by additional sulfonation. They may be supplied and used in salt form, such as the ammonium, sodium, and calcium salts. They may be accompanied by more or less of other compounds, such as wood sugars and inorganic salts.

For precipitating a ligno-bacitracin composition which is readily solubilized by alkalizing to a pH in the range 4.5–9, it is preferred to use the lignosulfonates. The precipitated alkali lignin complexes are not conducive to solubilization under practical conditions.

The precipitation may be substantially complete in one stage, or a multi-stage precipitation may be conducted to produce initial fractions of higher potency. Any amount of lignin sufficient to precipitate bacitracin may be employed. A substantial portion of the activity may be precipitated with a proportion of about 0.001 milligram of lignin per unit of bacitracin activity, and lower, although there appears to be no advantage in employing less. In multi-stage precipitation, a high potency first fraction of about 15–20% or greater of the activity may be obtained employing about 0.003–0.03 mg. of lignin per unit. In obtaining maximum precipitation in one stage, at least about 0.05 m. per unit is necessary for complexing the bacitracin in the presence of fermentation solubles. There appears to be no advantage in exceeding a proportion of about 0.25 mg. per unit of bacitracin activity.

As applied to bacitracin solutions produced by fermentation followed by filtration to remove suspended solids, containing on the order of 3–4% by weight of dissolved solids and on the order of 200–400 units of activity per milliliter, the proportion of lignin added is thus preferable in the range of about 0.05% to 10% by weight of the solution, calculated on the basis of the lignin content of the product employed. It is preferred to add to the solution about 2% or more of lignin for maximum recovery in one step.

The ligno-bacitracin composition may be precipitated in various ways in which bacitracin and lignin are mixed in solution at a pH up to 9. While it is possible to operate at a pH as low as 1, the bacitracin and lignin are preferably mixed at a pH of about 2–7.5. At the higher pH values, the solution is acidified, i.e., its pH lowered, until precipitation occurs. At a low pH, a precipitate may be formed as the lignin is added. When the bacitracin solution is at a pH below about 5.5, it is preferred to add the lignin in the form of an aqueous solution.

The pH of precipitation of the complex may vary, generally in the range of 1–6 as noted above, and it is adjusted for maximum precipitation. It is ordinarily preferred that the precipitation be conducted at a pH of about 2–4.

Various acidic compounds, such as hydrochloric acid, sulfuric acid, phosphoric acid, monosodium sulfate, aluminum sulfate, ammonium alum, ferrous sulfate, ferric sulfate, zinc chloride and the like, or combinations thereof, can be used for the precipitation step. The use of certain acidic salts, as for example aluminum sulfate, ammonium alum, ferrous sulfate, ferric sulfate, and zinc chloride results in the formation of precipitates that are not readily solubilized at pH 4.5–9 under practical conditions. On the other hand, the use of acids, as for example hydrochloric acid, sulfuric acid, and the like, or other acidic salts, as for example monosodium sulfate, or combinations of acidic salts and acids, as for example aluminum sulfate and sulfuric acid, ammonium alum and sulfuric acid, and the like, results in the formation of precipitates that are readily solubilized at pH 4.5–9. The acidic compound or combination selected for the precipitation step will therefore be dependent on the type of ligno-bacitracin preparation desired.

The precipitated complex is recovered by centrifugation, filtration or decantation. The recovered precipitate is then usually washed, one or more times, with water adjusted to the pH level used in the preceding precipitation step. If a water insoluble preparation is desired, the recovered precipitated ligno-bacitracin complex is dried as such, or is preferably adjusted to pH 3.5–4.5 and then dried.

Alternatively, if a water soluble preparation is desired, the recovered precipitated ligno-bacitracin complex is solubilized by adjusting to pH 4.5–9, preferably to pH 6.2–7.5, and then dried. The pH of solubilization of the ligno-bacitracin complex may be dependent on the type of lignin product or derivative used and should be adjusted to give substantially complete solubilization of the complex. Various alkaline compounds, including sodium hydroxide, potassium hydroxide, ammonium hydroxide, phosphates, carbonates, bicarbonates, and the like can be used to adjust the recovered precipitated ligno-bacitracin complex to the desired pH level. The concentration and drying operations can be accomplished by the various known methods, for example, rotary drum drying, lyophilization, spray drying, and so forth.

The dried ligno-bacitracin complex, prepared in either the soluble or insoluble form, can be used, without the addition of diluents, as an antibiotic supplement for addition to solid and liquid animal feeds. The water soluble ligno-bacitracin complex is especially useful for addition to animal drinking water. Ordinarily, it is preferred to use a suitable edible diluent in order to standardize the antibiotic content of the ligno-bacitracin complex. Insoluble diluents, such as soya products, starch, fish meal, grits, distillery by-products, brewery by-products and the like, and soluble diluents, such as sugars, salts and the like, can be used to formulate the insoluble ligno-bacitracin supplement. Soluble diluents can be used to formulate the soluble ligno-bacitracin supplement. Additional products, such as vitamin mixtures, amino acids, growth factor substances, minerals, etc. may also be added to improve the nutritional quality of the supplements.

For the production of pharmaceutical grade bacitracin, the solubilized ligno-bacitracin complex is preferably adjusted to pH 6–9, further preferably 7–9. The bacitracin is then separated from the lignin by extraction with a polar incompletely miscible organic solvent. Various solvents may be employed, including the aliphatic alcohols, araliphatic alcohols, aromatic alcohols, and other solvents having preferential solubility for bacitracin. Preferred solvents include the butanols, pentanols, hexanols, phenols, aralkyl alcohols and the like, such as amyl alcohol, cyclohexanol, benzyl alcohol and the preferred n-butanol.

Solid bacitracin may be recovered from the solvent solution, or preferably, the bacitracin is extracted into aqueous phase by contacting the solvent solution with water at a preferred pH of 2–4. For the acidification, various acidic compounds may be employed, such as hydrochloric, sulfuric, phosphoric, and citric acids. The aqueous solution is next preferably adjusted to a pH of about 5–7, such as with ammonium hydroxide, sodium hydroxide, basic anion exchange resins, and the like, and the solution is concentrated for the recovery of solid bacitracin. Alternatively, the sequence of extracting the aqueous solution with polar solvent and extraction of the bacitracin from the solvent into acidified aqueous solution may be repeated one or more times prior to recovery of solid bacitracin.

Reference is made in the preceding and subsequent disclosure to various lignin products available on the market and which may be employed in the invention. They include as illustrative alkali lignins, the Indulins. The Indulins are produced by pulping pine wood by the kraft process wherein the lignin is subjected to alkaline hydrolysis by sodium hydroxide and sodium sulfide. A unit weight of 840 is used for calculating combining weights. Indulin A is a purified pine wood lignin, consisting of over 99.5% of organic material. It is insoluble in water and acids and soluble in alkali. It has a typical sulfur content of about 1.4% and a typical methoxyl content of about 13.9%. Its pH is between 3 and 4.5. Indulin B is a purified sodium salt of lignin containing approximately 4% of sodium. It is insoluble in acids and soluble in water and alkali. Typical values are 1.4% sulfur content and 12.7% methoxyl content. Its pH ranges from 8 to 9. Indulin C is a crude sodium salt of lignin containing 9.8% of sodium. Part of the sodium is combined with lignin as sodium lignate and part is present in the form of free sodium salts, largely sodium carbonate. It contains some occluded black liquor. It is insoluble in acid and soluble in water and alkali. Typical values are 1.8% sulfur and 11.5% methoxyl. Its pH ranges from 9 to 10. The Indulins are described in the publication "Indulin," Bulletin L–6 of the Development Department, 1951 (Industrial Chemical Sales Division West Virginia Pulp and Paper Company).

Typical lignosulfonates which may be employed in the invention include the Orzans, the Toranils, and the Polyfons. Orzan A is essentially ammonium lignin sulfonate and wood sugars, having a typical weight proportion of lignin sulfonic acids of 59.1%. It is completely soluble in water and the pH in 30% solution is typically 4.3. A typical analysis is: C, 45.6%; H, 5.6%; S, 6.4%; N, 3.7%; Ca, 0.2%; O, 38.7%. Orzan S is essentially sodium lignin sulfonate and wood sugars, having a typical content of 57.6% of lignin sulfonic acids. It is completely soluble in water and the pH in 30% solution is typically 7. A typical analysis is: C, 41.6%; H, 5.0%; S, 7.0%; N, 0.5%; Ca, 0.2%; Na, 5.9%; O, 40.0%. Orzans A and S are described in a publication entitled "Orzan A and Orzan S," 1956 (Crown Zellerbach Corporation Chemical Products Division).

The Toranils are produced from desugared extract of coniferous woods, and their major constituent is calcium lignosulfonate in a proportion of about 96% by weight. The average molecular weight is about 1000, and the average molecule is believed to have about three methoxyl, five hydroxyl and two sulfonate groups. A typical methoxyl content is 8.8%. A typical analysis is: C, 61%; H, 6%; S, 2%; Ca, 3%; O, 28%. Toranil A is a 50% solution in water, and Toranil B is composed of about 94% of the calcium lignosulfonate.

The Polyfons are sodium lignosulfonates with varying proportions of sodium sulfonate groups, as follows: Polyfon H, 5.8%; Polyfon O, 10.9%; Polyfon T, 19.7%; Polyfon R, 26.9%; and Polyfon F, 32.8%. The primary raw material is purified pine wood lignin. Sugars, hemicelluloses and other degradation products of cellulose are removed in the process and not present in the products. The Polyfons are soluble in water, giving alkaline solutions ranging in pH from about 8 to 10.6.

The bacitracin starting materials employed in the following examples were produced by fermenting an aqueous nutrient medium with a bacitracin-producing strain of *Bacillus subtilis*, by submerged agitated and aerated fermentation, in the manner described in U.S. Patent 2,813,061, followed by conventional filtration to remove suspended solids including cellular debris. The bacitracin was assayed in the manner described in the patent, by the cup-plate assay method.

The following examples are illustrative of the methods and compositions according to the invention. It is to be understood that the invention is not limited to the examples nor to the particular materials, proportions, conditions and procedures set forth therein.

*Example 1*

Eighty grams of sodium lignosulfonate (Polyfon R) dissolved in 300 ml. of water, were added to 2 liters of bacitracin filtrate (pH 6.7) assaying 377 units per milliliter. The solution was then adjusted to pH 4.3 with 18 N sulfuric acid and the precipitated ligno-bacitracin complex recovered by centrifugation. The recovered solid was washed with pH 4.3 water (630 ml.). One-half of the washed solid was then slurried with enough water to form a thin paste and the slurry dried on a vacuum double drum rotary drier (29 inches vacuum, 15 lbs. per sq. inch steam pressure). 11.6 grams of a water insoluble solid ligno-bacitracin composition, assaying 14,400 bacitracin units per gram, were obtained.

The remaining one-half of the washed solid was slurried in water to form a thin paste and the slurry adjusted to pH 7 with ammonium hydroxide, solubilizing the ligno-bacitracin complex. The solution was then dried using the above conditions. Sixteen grams of a water soluble solid, assaying 14,000 bacitracin units per gram, were obtained.

*Example 2*

Forty grams of sodium lignosulfonate (Orzan S) were added to 1000 ml. of bacitracin filtrate (pH 6.7) assaying 365 units per milliliter. The solution was then adjusted to pH 2.0 with 18 N sulfuric acid and the precipitated ligno-bacitracin complex recovered by centrifugation. The recovered solid was washed with pH2 water (300 ml.). The washed solid was slurried with water to form a thin paste and the slurry adjusted to pH 6.2 with ammonium hydroxide, solubilizing the ligno-bacitracin complex. The solution was then dried on a vacuum double drum rotary drier (27.5 inches vacuum, 15 lbs. per sq. inch steam pressure). 7.8 grams of a water soluble solid ligno-bacitracin, assaying 16,900 bacitracin units per gram, were obtained.

*Example 3*

Forty grams of ammonium lignosulfonate (Orzan A) were added to 1000 ml. of bacitracin filtrate (pH 6.7) assaying 365 units per milliliter. The solution was then adjusted to pH 2.0 with 18 N sulfuric acid and the precipitated ligno-bacitracin complex recovered by centrifugation. The recovered solid was washed with pH 2 water (300 ml.). The washed solid was slurried with water to form a thin paste and the slurry adjusted to pH 6.2 with ammonium hydroxide, solubilizing the ligno-bacitracin complex. The solution was then dried on a vacuum double drum drier (27.5 inches vacuum, 15 lbs. per sq. inch steam pressure). 9.5 grams of a water soluble solid ligno-bacitracin, assaying 14,600 units per gram, were obtained.

The complex nature of the ligno-bacitracin was demonstrated with a dried product recovered from an aqueous solution at pH 6.5 in the above manner. When the product was extracted with anhydrous methanol, the amount of activity in the extract was too small to measure. On the other hand, bacitracin is readily extracted from dried fermentation product with anhydrous methanol.

*Example 4*

One hundred and twenty grams of calcium lignosulfonate (Toranil B), were added to 3000 ml. of bacitracin filtrate (pH 6.7) assaying 316 units per milliliter. The solution was then adjusted to pH 2.0 with 18 N sulfuric acid and the precipitated ligno-bacitracin complex recovered by centrifugation. The recovered solid was washed with pH 2 water (1000 ml.). The washed solid was slurried with water to form a thin paste and the slurry adjusted to pH 6.5 with ammonium hydroxide, solubilizing the ligno-bacitracin complex. The solution was then dried on a vacuum double drum rotary drier (27 inches vacuum, 15 lbs. per sq. inch steam pressure). 26.4 grams of a water soluble solid ligno-bacitracin, assaying 12,500 bacitracin units per gram were obtained.

*Example 5*

In the first precipitation stage, ammonium lignosulfonate (Orzan A) was added, in the amounts indicated below in Table III, to 2000 ml. portions of bacitracin filtrate (pH 6.7) assaying 428 units per milliliter. The solutions were then adjusted to pH 3.5 with 20% $NaHSO_4$ and the precipitated ligno-bacitracin complexes recovered by settling and decantation at 40° C. The recovered supernatants were then used at pH 3.5 for the second precipitation stage. Orzan A was added to the supernatants as indicated below. After readjustment of the mixtures to pH 3.5, the precipitated ligno-bacitracin complexes were recovered by settling and decantation at 40° C. The recovered solids from the two precipitation stages were solubilized by adjustment to pH 6.5 with 4 N $NH_4OH$.

TABLE III

| Orzan A quantity, percent by weight of solution | | Bacitracin activity recovered as ligno-bacitracin complex, percent | Activity of complex, units per gram on dry basis |
| --- | --- | --- | --- |
| First stage | Second stage | | |
| 0.5 | ------ | 22.1 | 23,000 |
| ------ | 3.5 | 39.9 | 14,300 |
| 1.0 | ------ | 36.7 | 20,000 |
| ------ | 3.0 | 30.1 | 11,100 |
| 2.0 | ------ | 59.4 | 21,100 |
| ------ | 2.0 | 13.2 | 5,800 |
| 3.0 | ------ | 68.0 | 15,600 |
| ------ | 1.0 | 6.5 | 3,300 |
| 4.0 | ------ | 70.0 | 16,900 |
| ------ | 0.0 | -------- | -------- |

*Example 6*

Partial precipitation of the bacitracin was conducted as in Example 5 by adding Orzan A in varying amounts to different portions of a bacitracin filtrate at pH 6.7 and containing 360 units per milliliter. The solution was adjusted to pH 3 with HCl for precipitation. The results are shown in the following Table IV.

TABLE IV

| Orzan A, percent by weight of solution | Bacitracin activity recovered as ligno-bacitracin complex, percent |
| --- | --- |
| 0.1 | 11.7 |
| 0.2 | 15.3 |
| 0.3 | 24.2 |
| 0.4 | 29.8 |
| 0.5 | 33.7 |

*Example 7*

Thirty grams of sodium lignosulfonate (Polyfon F) dissolved in 120 ml. water, were added to one liter of bacitracin filtrate (pH 6.7) assaying 369 units per milliliter. The solution was then adjusted to pH 3.5 with 18 N sulfuric acid and the precipitated ligno-bacitracin complex recovered by centrifugation. The recovered solid was washed with pH 3.5 water (455 ml.). The washed solid was then slurried in water (480 ml.) and the slurry adjusted to pH 8 with concentrated ammonium hydroxide, solubilizing the ligno-bacitracin complex.

The aqueous solution was then saturated with n-butanol (approximately 50 ml.) and extracted with butanol saturated with water (6 x 100 ml.). Water (100 ml.) was then added to the separated solvent extract (520 ml.) and the pH of the mixture adjusted to 3 with 18 N sulfuric acid. The aqueuos phase was separated and the solvent solution extracted with pH 3 water saturated with butanol (4 x 100 ml.).

The aqueous solution (495 ml.) was then adjusted to pH 8 with concentrated ammonium hydroxide and extracted with n-butanol saturated with water (6 x 100 ml.). Water (50 ml.) was then added to the separated solvent phase (570 ml.) and the pH of the mixture adjusted to 3 with 18 N $H_2SO_4$. The aqueous phase was separated and the solvent solution extracted with pH 3 water saturated with butanol (5 x 50 ml.).

The aqueous phase was then adjusted to pH 6.2 using 3.2 grams of strongly basic quaternary amine anion exchange resin in the hydroxyl form (Amberlite IRA-400) and the filtrate plus washings concentrated in vacuo to remove solvent. The colorless solution (400 ml.) at this point assayed 405 units per milliliter with an overall recovery of 44%. One-half of this solution was lyophilized yielding 0.98 gram of a white solid, assaying 78,000 bacitracin units per gram, representing an overall recovery of 41.5%.

*Example 8*

Ninety grams of ammonium lignosulfonate (Orzan A), were added to 9000 ml. of bacitracin filtrate (pH 6.7) assaying 318 units per milliliter. The solution was then adjusted to pH 3.0 with 6 N HCl and the precipitated ligno-bacitracin complex recovered by settling and decantation at 40° C. The recovered solid was slurried with water to form a thin paste and the slurry adjusted to pH 6.5 with 4 N ammonium hydroxide, solubilizing the ligno-bacitracin complex. 400 grams of solubilized concentrate, assaying 3200 units per gram were obtained.

A portion (150 grams) of the solubilized concentrate obtained from the first precipitation step was dried on a vacuum double drum rotary drier (27 inches vacuum; 25 lbs. per sq. inch steam pressure). 23 grams of a water soluble solid, assaying 19,800 bacitracin units per gram, were obtained.

A second portion (200 grams) of the solubilized concentrate obtained from the first precipitation step was used for the preparation of purified bacitracin. The solubilized concentrate (200 grams) was adjusted to pH 8 with 4 N $NH_4OH$ and extracted with butanol saturated with water (6 x 50 ml.). Water (50 ml.) was then added to the separated solvent extract (300 ml.) and the pH of the mixture adjusted to pH 3 with 6 N HCl. The aqueous phase was separated and the solvent solution extracted with pH 3 water saturated with butanol (5 x 50 ml.). The aqueous extract was then adjusted to pH 5.7 with strongly basic anion exchange resin in the hydroxyl form. The combined filtrate and washings after resin treatment (330 ml.) assayed 1,410 units per milliliter with a recovery of 72.7%. A portion (150 ml.) of this solution was lyophilized yielding 3 grams of white solid, assaying 65,000 bacitracin units per gram.

A second portion (150 ml.) of the resin treated solution was adjusted to pH 8 with 4 N $NH_4OH$ and extracted with butanol saturated with water (6 x 25 ml.). Water (25 ml.) was then added to the separated solvent extract (150 ml.) and the pH of the mixture adjusted to pH 3 with 6 N HCl. The aqueous phase was separated and the solvent solution extracted with pH 3 water saturated with butanol (6 x 25 ml.). The aqueous extract was then adjusted to pH 5.7 with the anion exchange resin. The combined filtrate and washings after resin treatment (196 ml.) assayed 1180 units per milliliter with a recovery of 79.5%. This solution was lyophilized yielding 2.24 grams of white solid, assaying 74,000 bacitracin units per gram.

Two hundred and seventy grams of Orzan A, dissolved in 600 mls. of water, were added to the supernatant (8960 ml.) recovered from the first precipitation step. The solution was adjusted to pH 3.0 with 6 N HCl and the precipitated ligno-bacitracin complex recovered by settling and decantation at 40° C. The recovered solid was slurried in water to form a thin paste and the slurry adjusted to pH 6.5 with 4 N ammonium hydroxide. 1265 grams of a solubilized concentrate, assaying 780 units per gram were obtained. This solution was then dried on a vacuum double drum rotary drier (27 inches vacuum, 25 lbs. per sq. inch steam pressure). Fifty-five grams of a water soluble solid were obtained, assaying 8000 bacitracin units per gram.

*Example 9*

The following Tables V through IX illustrate the precipitation of ligno-bacitracin at varying pH with a fixed proportion of the respective lignins. In the tests of Tables V through VIII equal volumes of the bacitracin filtrate were treated with equal volumes of aqueous solutions of the indicated amounts of the lignins. In the test of Table IX, the bacitracin filtrate was treated with one-fifth volume of aqueous solution containing the quantity of lignin. In these and in the tables of subsequent examples, the proportion of lignin is by weight in grams based upon the volume in milliliters of the bacitracin filtrate (w./v.).

TABLE V

| 2% Polyfon R added to bacitracin filtrate (pH 6.7) containing 377 units per ml., solution adjusted to indicated pH with $H_2SO_4$ | Bacitracin activity recovered as ligno-bacitracin complex, percent |
|---|---|
| 4.3 | 61 |
| 4.0 | 70 |
| 3.5 | 69 |
| 3.0 | 71 |
| 2.5 | 67 |
| 2.0 | 67 |

TABLE VI

| 4% Orzan A added to bacitracin filtrate (pH 6.7) containing 369 units per ml., solution adjusted to indicated pH with $H_2SO_4$ | Bacitracin activity recovered as ligno-bacitracin complex, percent |
|---|---|
| 4.5 | 31.8 |
| 4.0 | 60.2 |
| 3.0 | 68 |
| 2.0 | 88.7 |
| 1.0 | 78.4 |

TABLE VII

| 4% Orzan S added to bacitracin filtrate (pH 6.7) containing 366 units per ml., solution adjusted to indicated pH with $H_2SO_4$ | Bacitracin activity recovered as ligno-bacitracin complex, percent |
|---|---|
| 4.5 | 22.3 |
| 4.0 | 53 |
| 3.0 | 71 |
| 2.0 | 70.8 |
| 1.0 | 68.8 |

TABLE VIII

| 3% Toranil B added to bacitracin filtrate (pH 6.7) containing 392 units per ml., solution adjusted to indicated pH with $H_2SO_4$ | Bacitracin activity recovered as ligno-bacitracin complex, percent |
|---|---|
| 5.0 | [1] 0 |
| 4.0 | 39 |
| 3.5 | 50 |
| 3.0 | 67.5 |
| 2.0 | 65 |
| 1.0 | 52.5 |
| 0.5 | 43 |

[1] No precipitate formed.

TABLE IX

| 4% Orzan P added to bacitracin filtrate (pH 3) containing 275 units per ml., solution (pH 3.7) adjusted to indicated pH with NaHSO$_4$ | Bacitracin activity recovered as ligno-bacitracin complex, percent |
|---|---|
| [1] 3.7 | 48.8 |
| 3.0 | 69.2 |
| 2.5 | 79.0 |
| 2.0 | 72.0 |

[1] No NaHSO$_4$ added.

*Example 10*

The following Tables X through XIII illustrate the results obtained in precipitating ligno-bacitracin at a fixed pH with varying proportions of the lignins. In these tests, equal volumes of bacitracin filtrate were treated with equal volumes of aqueous solutions of the lignins.

TABLE X

| Indicated percent Polyfon R added to bacitracin filtrate (pH 6.7) containing 360 units per ml., solution adjusted to pH 4.3 with HCl | Bacitracin activity recovered as ligno-bacitracin complex, percent |
|---|---|
| 2 | 68.2 |
| 2.5 | 80 |
| 3 | 73.5 |
| 3.5 | 80 |
| 4 | 72 |

TABLE XI

| Indicated percent Polyfon T added to bacitracin filtrate (pH 6.7) containing 369 units per ml., solution adjusted to pH 4.3 with H$_2$SO$_4$ | Bacitracin activity recovered as ligno-bacitracin complex, percent |
|---|---|
| 1 | 37 |
| 2 | 63 |
| 3 | 69 |
| 4 | 75 |

TABLE XII

| Indicated percent Orzan P added to bacitracin filtrate (ph 6.7) containing 293 units per ml., solution adjusted to pH 2 with H$_2$SO$_4$ | Bacitracin activity recovered as ligno-bacitracin complex, percent |
|---|---|
| 2 | 60 |
| 3 | 72.7 |
| 4 | 72.8 |
| 5 | 73.5 |

TABLE XIII

| Indicated percent Toranil B added to bacitracin filtrate (pH 6.7) containing 308 units per ml., solution adjusted to pH 2 with H$_2$SO$_4$ | Bacitracin activity recovered as ligno-bacitracin complex, percent |
|---|---|
| 2 | 77.5 |
| 3 | 75.5 |
| 4 | 79.5 |
| 5 | 73.5 |

*Example 11*

The following Tables XIV–XVI illustrate the results obtained in precipitating ligno-bacitracin employing various acidic salts. The indicated amounts of lignin were added directly to the bacitracin filtrate.

TABLE XIV

4% Orzan P added to bacitracin filtrate (pH 6.7) containing 287 units per ml., 4% of indicated salts added to precipitate complex

| Salt added | pH after salt addition | Bacitracin activity recovered as ligno-bacitracin complex, percent |
|---|---|---|
| Al$_2$(SO$_4$)$_3$·18H$_2$O | 3.8 | 60 |
| FeSO$_4$·7H$_2$O | 5.5 | 36 |
| Fe$_2$(SO$_4$)$_3$·6H$_2$O | 2.3 | 68 |
| (NH$_4$)$_2$SO$_4$·Al$_2$(SO$_4$)$_3$·24H$_2$O | 4.0 | 62.5 |
| ZnCl$_2$ | 4.9 | 53 |

TABLE XV

4% Orzan P added to bacitracin filtrate (pH 6.7) containing 230 units per ml., 4% of indicated salt added and pH of mixture adjusted to 2 with H$_2$SO$_4$, salt added

| | Bacitracin activity recovered as ligno-bacitracin complex, percent |
|---|---|
| Al$_2$(SO$_4$)$_3$·18H$_2$O | 84.3 |
| FeSO$_4$·7H$_2$O | 82 |

TABLE XVI

4% Orzan P added to bacitracin filtrate (pH 6.7) containing 265 units per ml., 4% of indicated salt added and pH of mixture adjusted to 2 with H$_2$SO$_4$, salt added

| | Bacitracin activity recovered as ligno-bacitracin complex, percent |
|---|---|
| Fe$_2$(SO$_4$)$_3$·6H$_2$O | 63.4 |
| (NH$_4$)$_2$SO$_4$·Al$_2$(SO$_4$)$_3$·24H$_2$O | 78.2 |
| ZnCl$_2$ | 78.5 |

*Example 12*

Eight hundred grams of alkali lignin (Indulin C) dissolved in 20 liters of water were added to 20 liters of bacitracin filtrate (pH 7) assaying 240 units per milliliter. The solution was then adjusted to pH 4.3 with concentrated HCl and the precipitated ligno-bacitracin complex recovered by centrifugation. The recovered solid was washed with pH 4.3 water. The washed solid was slurried with water to form a thin paste and a portion of the mixture dried on a vacuum double drum drier (27.5 inches vacuum, 18 lbs. per sq. inch steam pressure). A water insoluble ligno-bacitracin assaying 3000 units per gram was obtained.

*Example 13*

A chick feeding test was conducted wherein day old chicks were divided into four groups, with one group receiving only the basal chick ration (Table XVII), another group receiving the basal ration supplemented with a commercial bacitracin supplement (Pabst bacitracin supplement—"Bio-Pabst") and the remaining two groups receiving the basal ration supplemented with different amounts of the water insoluble ligno-bacitracin supplement prepared according to Example 12. The data obtained at the end of eight weeks are given in Table XVIII.

TABLE XVII

Basal chick ration:
- Ground yellow corn __percent ingredients__ 48.9
- Soybean oil meal, 44% __do__ 25.0
- Corn gluten meal __do__ 10.0
- Stabilized animal tallow __do__ 5.0
- Dried Brewers yeast __do__ 4.0
- Condensed fish solubles __do__ 3.0
- Limestone __do__ 1.25
- Alfalfa leaf meal, 17% __do__ 1.0
- Steamed bone meal __do__ 1.0
- Iodized salt __do__ 0.5
- Vitamin A (4000) and Vitamin D (750) supplement __percent ingredients__ 0.2
- Riboflavin, calcium pantothenate, choline, niacin supplement [1] __percent ingredients__ 0.1
- Vitamin $B_{12}$ supplement [2] __do__ 0.08
- DL methionine __do__ 0.05
- Manganese sulfate __do__ 0.03
- Vitamin E acetate __mg. percent__ 55
- Menadione __do__ 110

[1] Supplement contains 2 gms. riboflavin, 5 gms. calcium pantothenate, 50 gms. choline chloride, and 12.5 gms. niacin per pound.
[2] Supplement contains 6 mg. vitamin $B_{12}$ per pound.

TABLE XVIII

| Supplement added | Equivalent bacitracin activity, grams per ton feed | Data at end of 8 weeks | | |
|---|---|---|---|---|
| | | Average chick weight (gms.) | Average chick weight gains (gms.) | Average feed efficiency |
| None | | 1,436 | 1,363 | 2.47 |
| Bacitracin supplement | 10 | 1,484 | 1,411 | 2.43 |
| Ligno-bacitracin | 10 | 1,482 | 1,409 | 2.43 |
| Do | 50 | 1,539 | 1,465 | 2.34 |

Example 14

A chick feeding test was conducted wherein day old chicks were divided into three groups, with one group receiving only the basal chick ration, another group receiving the basal ration supplemented with the commercial bacitracin supplement of Example 13 and the remaining group receiving the basal ration supplemented with a water soluble ligno-bacitracin supplement assaying 7625 units of bacitracin per gram, prepared from ammonium lignosulfonate according to the method of Example 3. The data obtained at the end of 8 weeks are given in Table XIX.

TABLE XIX

| Supplement added | Equivalent bacitracin activity, grams per ton feed | Average chick weight (gms.) | Average chick weight gains (gms.) | Average feed efficiency |
|---|---|---|---|---|
| None | | 1,070 | 1,035 | 2.33 |
| Bacitracin supplement | 10 | 1,209 | 1,163 | 2.29 |
| Ligno-bacitracin | 10 | 1,216 | 1,180 | 2.29 |

The invention thus provides bacitracin products characterized by exceptional stability and utility, including both stable complex compositions useful as feed supplements and stable white pharmaceutical bacitracin. The products are obtained in high yields in an attractive and economical process. The products have high activities for feed supplements and pharmaceutical grade bacitracin.

The new ligno-bacitracin complex satisfies the need for both water insoluble and water soluble feed supplements, and for supplements which are unaffected by exposure to high humidity, as compared to prior products.

The invention is hereby claimed as follows:

1. The process which comprises forming an aqueous solution of bacitracin and an alkali-soluble lignin precipitant from the group consisting of alkali lignins and ligno-sulfonates, and recovering a solid composition of bacitracin and said lignin therefrom.

2. The process which comprises adding to an aqueous solution containing bacitracin an alkali-soluble lignin precipitant from the group consisting of alkali lignins and ligno-sulfonates, said solution containing bacitracin being obtained by fermenting an aqueous nutrient medium with a bacitracin producing organism.

3. The process of producing a stabilized form of bacitracin which comprises adding to an aqueous solution containing bacitracin an alkali-soluble lignin precipitant, the quantity of said lignin being within the range of 0.001 milligram to 0.25 milligram of said lignin per unit of bacitracin activity in said solution, and separating the resultant precipitate from said solution.

4. The process for recovering bacitracin from an aqueous solution which comprises precipitating a composition of bacitracin and an alkali-soluble lignin precipitant from the group consisting of alkali lignins and ligno-sulfonates, separating the precipitate, and alkalizing the precipitate in aqueous medium to dissolve the precipitate.

5. The process for recovering bacitracin from an aqueous solution which comprises precipitating a composition of bacitracin and an alkali-soluble lignin precipitant from the group consisting of alkali lignins and ligno-sulfonates, separating the precipitate, alkalizing the precipitate in aqueous medium to dissolve the precipitate, and extracting bacitracin from said medium into an incompletely miscible polar organic solvent.

6. The process for recovering bacitracin from an aqueous solution which comprises precipitating a composition of bacitracin and an alkali-soluble lignin precipitant from the group consisting of alkali lignins and ligno-sulfonates, separating the precipitate, alkalizing the precipitate in aqueous medium to dissolve the precipitate, extracting bacitracin from said medium into an incompletely miscible polar organic solvent, extracting bacitracin from said solvent into an aqueous acidic solution, and recovering bacitracin from said solution.

7. The process of producing a stabilized form of bacitracin which comprises adding to an aqueous solution containing bacitracin a lignosulfonate precipitant, the quantity of said lignosulfonates being within the range of 0.001 milligram to 0.25 milligram of said lignosulfonate per unit of bacitracin activity in said solution, and separating the resultant precipitate from said solution.

8. The process of producing a stabilized form of bacitracin which comprises adding to an aqueous solution containing bacitracin an alkali lignin precipitant, the quantity of said lignin being within the range of 0.001 milligram to 0.25 milligram of said lignin per unit of bacitracin activity in said solution, and separating the resultant precipitate from said solution.

9. A complex composition of bacitracin and an alkali-soluble lignin from the group consisting of alkali lignins and lignosulfonates in amounts corresponding to 0.001 milligram to 0.25 milligram of said lignin per unit of bacitracin activity.

10. A complex composition of bacitracin and a lignosulfonate in amounts corresponding to 0.001 milligram to 0.25 milligram of said lignosulfonate per unit of bacitracin activity.

11. A complex composition of bacitracin and an alkali lignin in amounts corresponding to 0.001 milligram to 0.25 milligram of said lignin per unit of bacitracin activity.

12. A composition of bacitracin and a stabilizing quantity of an alkali-soluble lignin from the group consisting of alkali lignins and lignosulfonates.

13. An animal feed comprising a complex composition of bacitracin and an alkali-soluble lignin from the group consisting of alkali lignins and lignosulfonates in amounts corresponding to 0.001 milligram to 0.25 milligram of said lignin per unit of bacitracin activity, and an edible diluent.

References Cited in the file of this patent

UNITED STATES PATENTS 2,739,063 Wehrmeister _____ Mar. 20, 1956
2,763,590 Gollaher _____ Sept. 18, 1956

OTHER REFERENCES

Anker et al.: J. Biol. Chem., 1948, pp. 249–255.
Spector: Handbook of Toxicology, vol. II, Antibiotics, pages 28–30, published 1957 by W. B. Saunders.
Pearl: Chem. and Eng. News, pp. 2950–2953, vol. 26, No. 40, Oct. 4, 1948.